US012489355B2

United States Patent
Walley et al.

(10) Patent No.: US 12,489,355 B2
(45) Date of Patent: Dec. 2, 2025

(54) LEAKAGE REDUCTION FOR RECTIFIERS AND INVERTERS USING BIPOLAR SIGNALING

(71) Applicant: Avago Technologies International Sales Pte. Limited, Singapore (SG)

(72) Inventors: John Walley, Ladera Ranch, CA (US); Jim Le, Timanth, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 223 days.

(21) Appl. No.: 18/493,121

(22) Filed: Oct. 24, 2023

(65) Prior Publication Data

US 2024/0413766 A1 Dec. 12, 2024

Related U.S. Application Data

(60) Provisional application No. 63/507,247, filed on Jun. 9, 2023.

(51) Int. Cl.
*H02M 1/00* (2007.01)

(52) U.S. Cl.
CPC ....... *H02M 1/0048* (2021.05); *H02M 1/0045* (2021.05); *H02M 1/0093* (2021.05)

(58) Field of Classification Search
CPC .......................... H02M 1/0093; H02M 1/0045
See application file for complete search history.

(56) References Cited

U.S. PATENT DOCUMENTS 7,535,262 B2 * 5/2009 Abdoulin ................ H02M 7/06
327/333
10,819,289 B1 * 10/2020 Wu ...................... H03F 3/45937

FOREIGN PATENT DOCUMENTS

JP        H04355661 A     12/1992

OTHER PUBLICATIONS

N. Vazquez, H. Rodriguez, C. Hernandez, E. Rodriguez and J. Arau, "Three-Phase Rectifier With Active Current Injection and High Efficiency," in IEEE Transactions on Industrial Electronics, vol. 56, No. 1, pp. 110-119, Jan. 2009 (Year: 2009).*
Kurtsevoy, Y., Challenge the Conventional—Make Unipolar Dacs Bipolar, https://pdfserv.maximintegrated.com/en/an/AN5581.pdf, Mar. 3, 2014, 10 pages.

(Continued)

*Primary Examiner* — Peter M Novak
(74) *Attorney, Agent, or Firm* — Quarles & Brady LLP

(57) ABSTRACT

The subject technology is directed to power conversion systems and methods. In some embodiments, the subject technology provides a device comprising a first switch configured to receive a first signal and a second switch configured to receive a second signal. A voltage generator is coupled to the first switch. The device further comprises a first resistor coupled to the first switch and a second resistor coupled to the first resistor. The first switch is further coupled to a first capacitor, which acts as a charge pump to generate the negative voltage such that the output of the device comprises both positive and negative voltages. Embodiments of the subject technology achieve bipolar signaling based on a unipolar design, effectively minimizing DC leakage and overall power consumption. There are other embodiments as well.

20 Claims, 5 Drawing Sheets

(56) References Cited

OTHER PUBLICATIONS

Teh, Y. et al., DTMOS-Based Pulse Transformer Boost Converter With Complementary Charge Pump for Multisource Energy Harvesting, IEEE Transactions on Circuits and Systems—II: Express Briefs, 2016, 63(5):508-512.
European Patent Office, Extended Search Report, Application No. 24180373.3, Oct. 31, 2024, 10 pages.

\* cited by examiner

LEAKAGE REDUCTION FOR RECTIFIERS AND INVERTERS USING BIPOLAR SIGNALING

CROSS-REFERENCE TO RELATED APPLICATIONS

This application is a non-provisional application claiming priority to U.S. Patent Application No. 63/507,247, filed Jun. 9, 2023, by Walley et al. and titled, "Bipolar Rectifier and Inverter", which is incorporated herein by reference in its entirety for all purposes.

FIELD OF INVENTION

The subject technology is directed to power conversion systems and methods.

BACKGROUND OF THE INVENTION

Over the past decades, the realm of power transfer and conversion systems has witnessed considerable technological advancements, particularly in the design and development of rectifiers and inverters. A rectifier is an electrical device that converts alternating current (AC) signals to direct current (DC) signals, and an inverter is an electrical device that converts direct current (DC) signals to alternating current (AC) signals.

Various approaches involve unipolar IP-based designs where both the inputs and outputs operate within a voltage spectrum that ranges from near ground to a positive voltage. The popularity of unipolar designs can be attributed to their simplicity, both in terms of design and operation. However, they have a number of limitations, including high DC leakage. DC leakage is a current that flows through an unintended path in a circuit, which can compromise the efficiency and reliability of the system.

Various approaches for enhanced power conversion systems have been explored, but they have proven to be insufficient. It is important to recognize the need for new and improved power conversion systems and methods.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
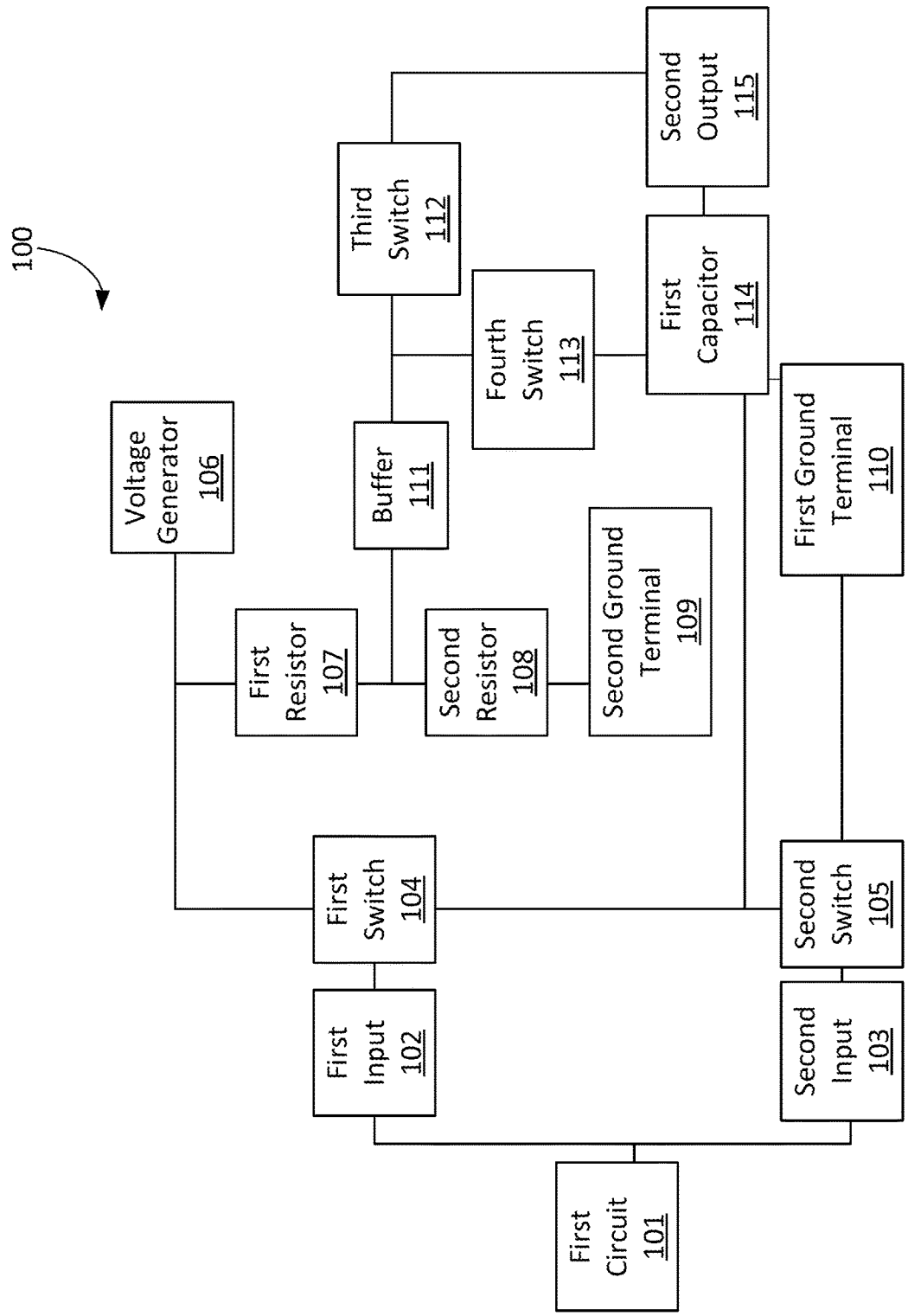
FIG. 1 is a block diagram illustrating a power conversion system according to embodiments of the subject technology.

The subject technology is directed to power conversion systems and methods. In some embodiments, the subject technology provides a device comprising a first switch configured to receive a first signal and a second switch configured to receive a second signal. A voltage generator is coupled to the first switch. The device further comprises a first resistor coupled to the first switch and a second resistor coupled to the first resistor. The first switch is further coupled to a first capacitor, which acts as a charge pump to generate the negative voltage such that the output of the device comprises both positive and negative voltages. Embodiments of the subject technology achieve bipolar signaling based on a unipolar design, effectively minimizing DC leakage and overall power consumption. There are other embodiments as well.

Some approaches for implementing power conversion systems are primarily based on unipolar designs where both inputs and outputs operate within a voltage spectrum that ranges from near ground to a positive voltage. This design methodology, while seemingly simple in its application, often introduces the adverse effects of high DC leakage—a phenomenon where current deviates from its intended path— leading to systemic inefficiencies. Such inefficiencies, when considered in the context of power conversion, can undermine the reliability and operational effectiveness of the system. In response to the inherent drawbacks of unipolar systems, bipolar designs emerged as an attractive alternative, allowing the DC signal on the inverter output or rectifier input to remain close to the ground. However, the implementation of bipolar designs brings its own set of challenges. One of the challenges is the management of negative voltages. Bipolar systems must be able to handle both positive and negative voltages, which can pose intricacies in circuit design and overall power consumption. Furthermore, the integration complexities of bipolar designs introduce difficulties in component selection and necessitate rigorous optimization at a system-wide level.

In various embodiments, the subject technology achieves bipolar signaling based on a unipolar design for power conversion systems. By integrating the innate simplicity of unipolar systems with the advanced efficiency of bipolar signaling, the invention addresses prevalent challenges— such as high DC leakage—while maintaining design and operational ease. The flexibility it offers in voltage control— such as effectively handling both positive and negative voltage states—substantially diminishes the complexities often associated with bipolar systems. In various embodiments, rapid bipolar signaling is achieved seamlessly, enhancing the dynamic response of the power conversion system. For instance, in rapid switching scenarios (e.g., burst signaling), embodiments of the subject technology ensure immediate DC shift adjustments within a minimal duration (e.g., a single cycle), enabling reliable data transmission with minimized power consumption and reduced interference. Embodiments of the subject technology enhance overall system reliability, ensuring reduced disruptions and an extended operational lifespan. It is to be appreciated that the subject technology is adaptable to any power conversion or transfer systems and is not limited to rectifiers and inverters.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the subject technology is not intended to be limited to the embodiments presented but is to be accorded the widest scope consistent with the principles and novel features disclosed herein.

In the following detailed description, numerous specific details are set forth in order to provide a more thorough understanding of the subject technology. However, it will be apparent to one skilled in the art that the subject technology may be practiced without necessarily being limited to these specific details. In other instances, well-known structures and devices are shown in block diagram form, rather than in detail, in order to avoid obscuring the subject technology.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require the selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect includes a device, which comprises a first switch comprising a first input, the first input being configured to receive a first signal. The device further comprises a voltage generator coupled to the first switch, the voltage generator being characterized by a first voltage. The device further comprises a second switch coupled to the first switch, the second switch comprising a second input configured to receive a second signal. The device further comprises a first ground terminal coupled to the second switch. The device further comprises a first resistor coupled to the first switch and the voltage generator, the first resistor being characterized by a first resistance. The device further comprises a second resistor coupled to the first resistor, the second resistor being characterized by a second resistance.

The device further comprises a buffer comprising a third input and a first output, the third input being coupled to the first resistor and the second resistor, the first output being characterized by a second voltage;

a third switch coupled to the first output. The device further comprises a first capacitor coupled to the first switch and the third switch. The device further comprises a second output coupled to the third switch and the first capacitor.

Implementations may include one or more of the following features. The device further comprises a first circuit coupled to the first switch and the second switch, the first circuit being configured to send the first signal to the first input and send the second signal to the second input. The second output is configured to output a first output signal. The buffer further comprises a fourth input coupled to the first output. The first output signal comprises a positive signal and a negative signal. The device further comprises a fourth switch coupled to the third switch and the first capacitor. The first switch comprises a complementary metal-oxide semiconductor (CMOS) or a bipolar junction transistor (BJT). The first switch comprises a gate coupled to the first input. A ratio of the first resistance to the second resistance is less than 1.1:1. The second voltage is less than or equal to half of the first voltage. The third switch comprises a p-channel metal-oxide semiconductor (PMOS) or a laterally-diffused metal-oxide semiconductor (LDMOS).

According to another embodiment, the subject technology provides a device, which comprises a first switch comprising a first input, the first input being configured to receive a first signal. The device further comprises a voltage generator coupled to the first switch, the voltage generator being characterized by a first voltage. The device further comprises a second switch coupled to the first switch, the second switch comprising a second input configured to receive a second signal. The device further comprises a first ground terminal coupled to the second switch. The device further comprises a first resistor coupled to the first switch and the voltage generator. The device further comprises a second resistor coupled to the first resistor. The device further comprises a buffer comprising a third input and a first output, the third input being coupled to the first resistor and the second resistor, the first output being characterized by a second voltage. The device further comprises a third switch coupled to the first output. The device further comprises a first capacitor coupled to the first switch and the third switch. The device further comprises a second output coupled to the third switch and the first capacitor.

Implementations may include one or more of the following features. The device further comprises a first circuit coupled to the first switch and the second switch, the first circuit being configured to send the first signal to the first input and send the second signal to the second input to control switching of the first switch and the second switch. The second output is configured to output a first output signal. The device further comprises a fourth switch coupled to the third switch and the first capacitor. The second voltage is less than or equal to half of the first voltage. The device further comprises a second ground terminal coupled to the second resistor.

According to yet another embodiment, the subject technology provides a device, which comprises a first switch comprising a first input, the first input being configured to receive a first signal. The device further comprises a voltage generator coupled to the first switch, the voltage generator being characterized by a first voltage. The device further comprises a second switch coupled to the first switch, the second switch comprising a second input configured to receive a second signal. The device further comprises a first ground terminal coupled to the second switch. The device further comprises a first resistor coupled to the first switch and the voltage generator, the first resistor being characterized by a first resistance. The device further comprises a second resistor coupled to the first resistor, the second resistor being characterized by a second resistance. The device further comprises a second ground terminal coupled to the second resistor. The device further comprises a buffer comprising a third input and a first output, the third input being coupled to the first resistor and the second resistor, the first output being characterized by a second voltage. The device further comprises a third switch coupled to the first output. The device further comprises a first capacitor coupled to the first switch and the third switch. The device further comprises a second output coupled to the third switch and the first capacitor.

Implementations may include one or more of the following features. The device further comprises a first circuit coupled to the first switch, the first circuit being configured to send the first signal to the first input. A ratio of the first resistance to the second resistance is less than 1.1:1. The device further comprises a fourth switch coupled to the third switch and the first capacitor.

FIG. 1 is a block diagram illustrating a power conversion system 100 according to not unduly limit the scope of the claims. One of ordinary skill in the art would recognize many variations, alternatives, and modifications. System 100 may be implemented as any type of power conversion system and may be part of a larger device, such as a wireless charger. For example, system 100 may be implemented as a rectifier, which refers to an electrical device that converts alternating current (AC) signals to direct current (DC) signals. In another example, system 100 may be implemented as an inverter, which refers to an electrical device that converts direct current (DC) signals to alternating current (AC) signals. System 100 may be used power supplies, battery chargers, battery-operated devices, and/or the like. Depending on the implementation, system 100 may be wholly or partially integrated into an integrated circuit chip.

As shown, system 100 may include at least one of a first circuit 101, a first switch 104, a second switch 105, a voltage generator 106, a first resistor 107, a second resistor 108, a first ground terminal 110, a second ground terminal 109, a buffer 111, a third switch 112, a first capacitor 114, a fourth switch 113, and a second output 115. As an example, system 100 is configured to receive an AC signal and rectifies the AC signal into a DC signal. Voltage generator 106 may output the DC voltage to provide energy for any subsequent processing circuitry. In an example, system 100 is configured to receive a DC signal and output an AC signal at second output 115. For example, the term "conversion" (e.g., from AC to DC or vice versa) includes conversion of non-ideal signals as may be implemented into real-world applications. Accordingly, AC signals may include non-ideal AC signals (e.g., not perfectly sinusoidal). Similarly, DC signals may include non-ideal DC signals (e.g., not perfectly constant).

In various implementations, system 100 includes a first switch 104 and a second switch 105. As an example, the term "switch" may refer to an electronic component capable of controlling, directing, or modulating electrical flow within a circuit. First switch 104 and/or second switch 105 may include, but are not limited to, field effect transistors (FETs) such as Metal Oxide Semiconductor FETs (MOSFETs), laterally-diffused metal-oxide semiconductor (LDMOS), a bipolar junction transistor (BJT), a thyristor, or other types of transistors or other types of switches. In some cases, first switch 104 includes a complementary metal-oxide semiconductor (CMOS) or a bipolar junction transistor (BJT). In some embodiments, first switch 104 and second switch 105 may be coupled to first circuit 101, which is configured to control the operation of first switch 104 and second switch 105. Circuit 101 may include circuitry and/or other components, such as programmable logic, microcontrollers, and/or software, and can send control signals to first switch 104 and second switch 105 to regulate their operation.

According to various embodiments, first switch 104 includes a first input 102, and second switch includes a second input 103. The term "input" may refer to a point or node in an electrical circuit where a signal (e.g., voltage or current) is fed into a device or component. First input 102 and/or second input 103 may include, but is not limited to, a terminal, a lead, or a pin on a semiconductor device, or points of connection on a printed circuit board (PCB). For instance, first switch 104 includes a gate coupled to first input 102. In an example, first switch 104 includes a bipolar junction transistor (BJT), which may include a base coupled to first input 102. Depending on the implementation, first circuit 101 may be configured to send one or more signals to first switch 104 and second switch 105 to change their ON/OFF state. For example, first input 102 is configured to receive a first signal from first circuit 101. First switch 104 may change an ON/OFF state in response to the first signal. In some cases, first switch 104 may switch from an OFF state to an ON state upon receiving the first signal. Similarly, first switch 104 may switch from an ON state to an OFF state upon receiving the first signal. Second input 103 may be configured to receive a second signal from first circuit 101. Second switch 105 may change an ON/OFF state in response to the second signal. For example, second switch 105 may switch from an OFF state to an ON state upon receiving the second signal. Similarly, second switch 105 may switch from an ON state to an OFF state upon receiving the second signal.

In some embodiments, system 100 further includes voltage generator 106 coupled to first switch 104. Voltage generator 106 may be characterized by a first voltage. The term "voltage generator" may refer to a device that produces, regulates, or maintains a specific voltage level within an electrical system, either by providing or absorbing energy. The voltage generator may be configured as a voltage source or a voltage sink, depending on the implementation of the subject technology. For instance, voltage generator 106 may be configured as a voltage source, which supplies energy to the system, converting DC into AC to generate the desired voltage level. In some examples, voltage generator 106 may be configured as a voltage sink, which absorbs energy while converting AC into DC, establishing the necessary voltage level by drawing or sinking current as required. Depending on the implementation, the power source provided by voltage generator 106 may include a positive signal and/or a negative signal. The term "positive signal" may refer to a part of the voltage or current waveform that remains above ground in an electrical system. The term "negative signal" may refer to a part of the voltage or current waveform that drops below ground.

In some implementations, first resistor 107 may be coupled to first switch 104 and/or voltage generator 106. First resistor 107 may be characterized by a first resistance. For instance, the term "resistance" refers to the opposition that a substance offers to the flow of electric current. Resistance can be determined or calculated using Ohm's law, R=V/I, wherein V is the voltage across the resistor, and/is the current flowing through it. Resistance can be measured in ohms (Ω). System 100 may further include second resistor 108 coupled to first resistor 107. Second resistor 108 may be characterized by a second resistance. Depending on the implementation, a ratio of the first resistance to the second resistance may be less than 1.1:1. For instance, a ratio of the first resistance to the second resistance may be 1:1.

In various implementations, second switch 105 is coupled to a first ground terminal 110. Second resistor may be coupled to a second ground terminal 109. For instance, the term "ground terminal" or "ground" may refer to a connection point that is used to reference the electrical potential of a circuit to the ground plane. The ground plane is a conductive surface that is used to dissipate electrical noise and to provide a common reference point for all of the components in a circuit. In some embodiments, system 100 further includes a buffer 111, which includes a third input and a first output. For example, the term "buffer" or "voltage buffer" may refer to an electronic component that isolates the input from the output, ensuring voltage consistency and preventing any interference from downstream components. Buffer 111 may include, but is not limited to, an operational amplifier (op-amp) voltage buffer, a digital buffer, a current buffer, a voltage divider, and/or the like. The term "output" may refer to a terminal or connection point that provides a signal to another device or circuit element. In an example, buffer 111 includes an op-amp, which refers to a high-gain electronic voltage amplifier with a differential input and a single-ended output. In various examples, the third input of buffer 111 is coupled to first resistor 107 and second resistor 108. The first output of the buffer is characterized by a second voltage. For instance, due to the voltage-dividing action of first resistor 107 and second resistor 108, the second voltage at the first output could be a fraction of the first voltage at voltage generator 106. In some cases, the second voltage may be less than or equal to half of the first voltage.

In various implementations, system 100 further includes a third switch 112, which may be coupled to the first output of buffer 111. As an example, third switch 112 may include, but is not limited to, field effect transistors (FETs) such as Metal Oxide Semiconductor FETs (MOSFETs), a bipolar junction transistor (BJT), a thyristor, or other types of transistors or other types of switches. In some cases, third switch 112 may include a p-channel metal-oxide-semiconductor (PMOS) and/or a laterally-diffused metal-oxide semiconductor (LDPMOS). In some embodiments, first capacitor 114 may be coupled to first switch 104 and/or third switch 112. The term "capacitor" may refer to an electronic component that stores energy in an electric field. First capacitor 114 may include, but is not limited to, a ceramic capacitor, a film capacitor, an electrolytic capacitor, and/or the like. In some implementations, a fourth switch 113 is coupled to third switch 112 and first capacitor 114. Fourth switch 113 may include, but is not limited to, field effect transistors (FETs) such as Metal Oxide Semiconductor FETs (MOSFETs), a bipolar junction transistor (BJT), a thyristor, or other types of transistors or other types of switches.

In various examples, system 100 includes a second output, which is configured to provide an output signal of system 100 to subsequent circuitry for further processing. Second output 115 may be coupled to third switch 112 and first capacitor 114. As an example, second output 115 is configured to output a first output signal. Depending on the implementation, the first output signal may include an AC signal and/or a DC signal. The term "AC signal" or "alternating current signal" may refer to a current, voltage, or numerical sequence that reverses direction periodically. In an AC signal, the current or voltage alternates between positive and negative polarities. The AC signal may include, but is not limited to, sinusoidal waveforms, square waveforms, triangular waveforms, and/or the like. The term "DC signal" or "direct current signal" may refer to a current, voltage, or numerical sequence that exhibits only positive values or only negative values. The electric current flows in a constant direction, without changing polarity. The DC signal may include, but is not limited to, a constant voltage signal, a constant current signal, and/or the like.

Figure 2:
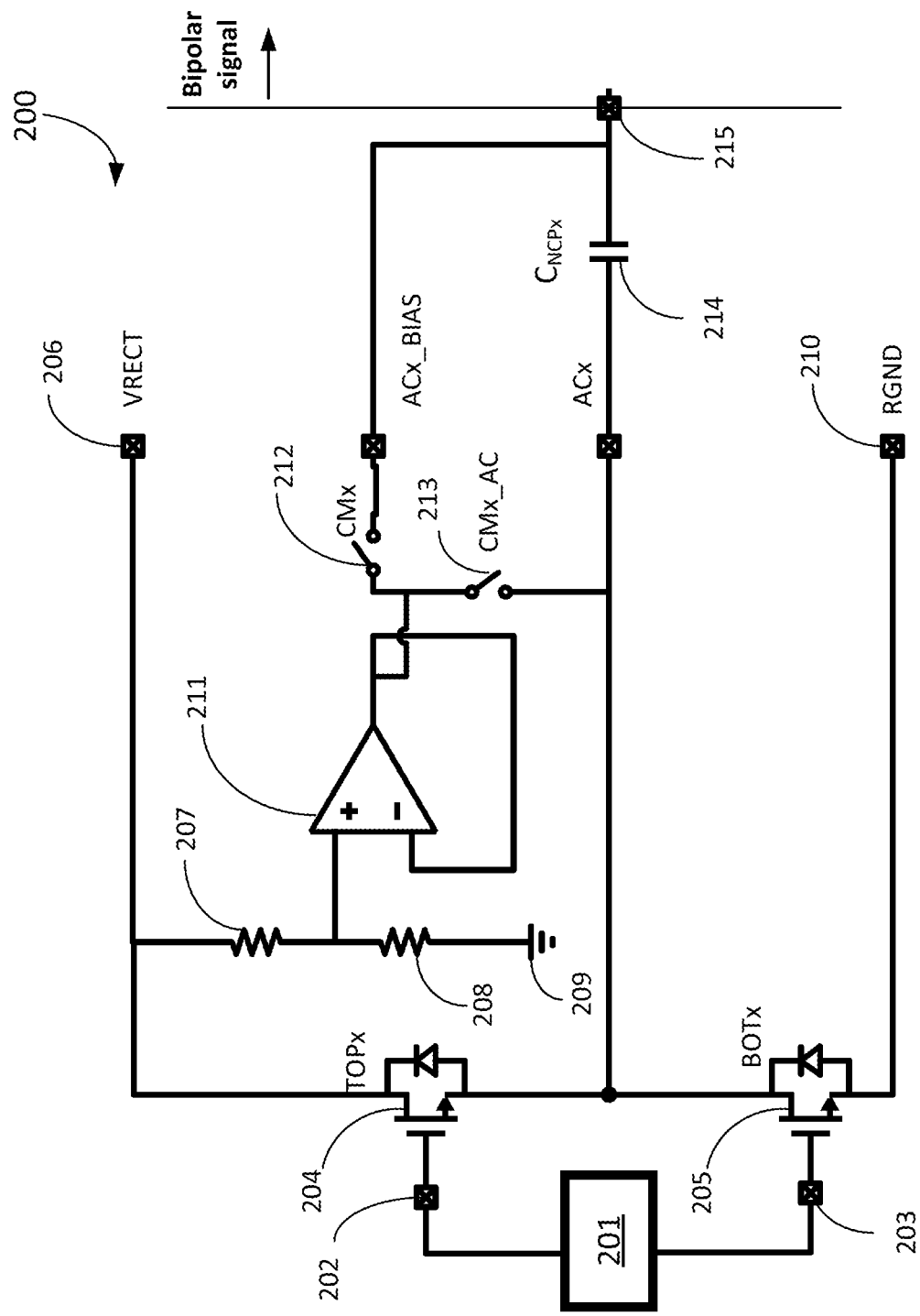
FIG. 2 is a circuit diagram illustrating a power conversion system according to embodiments of the subject technology.

FIG. 2 is a circuit diagram illustrating a power conversion system 200 according to not unduly limit the scope of the claims. One of ordinary skill in the art would recognize many variations, alternatives, and modifications. As previously noted, system 200 may be implemented as any type of power conversion system, such as a rectifier, an inverter, or other bidirectional converter.

As shown, system 200 may include at least one of a first circuit 201, a first switch 204, a second switch 205, a voltage generator 206, a first resistor 207, a second resistor 208, a first ground terminal 210, a second ground terminal 209, a buffer 211, a third switch 212, a first capacitor 214, a fourth switch 213, and a second output 215. For example, system 200 may be implemented as an inverter, which is configured to receive an input signal (e.g., a DC signal provided by voltage generator 206) and produce an output signal (e.g., an AC signal output at second output 215). For instance, voltage generator 206 may be characterized by a first voltage, denoted as VRECT. Second output 215 may be configured to output a first output signal, which may be characterized by a target voltage depending on the application. In various implementations, the first voltage of voltage generator 206 may be determined or adjusted based on the target voltage.

In some embodiments, the operation of system 200 relies on the systematic and coordinated switching of first switch 204 and second switch 205 according to specific conditions. For instance, first switch 204—denoted as TOPx—includes a first input 202. Second switch 205—denoted as BOTx—includes a second input 203. First switch 204 and second switch 205 may be controlled by first circuit 201. For example, first circuit 201 is configured to send one or more signals to first switch 204 and second switch 205 to change their ON/OFF state. First resistor 207 may be coupled to first switch 204 and/or voltage generator 206. First resistor 207 may be characterized by a first resistance. Second resistor 208 may be coupled to first resistor 207. Second resistor 208 may be characterized by a second resistance. Depending on the implementation, the first resistance and the second resistance may be closely matched. For instance, a ratio of the first resistance to the second resistance may be less than 1.1:1. In some cases, a ratio of the first resistance to the second resistance may be 1:1. Second switch 205 may be coupled to a first ground terminal 210—denoted as RGND. Second resistor 208 may be coupled to a second ground terminal 209.

In some embodiments, system 200 further includes buffer 211, which includes a third input and a first output. The first output may be characterized by a second voltage-denoted as ACx_BIAS. Buffer 211 may further comprise a fourth input, which is coupled to the first output. Third switch 212—denoted as CMx—may be coupled to the first output of buffer 211. In various examples, a resistor may be integrated from the CMx pin to ground, serving as an effective means to maintain the bipolar signals after DC settling has occurred. A resistance value of the resistor may be dynamically adjusted to accommodate a range of operational conditions and requirements, enhancing the system's adaptability and efficiency. First capacitor 214—denoted as $C_{NCPx}$—may be coupled to first switch 204 and/or third switch 212. For instance, first capacitor 214 includes a first side coupled to first switch 204 and a second side coupled to third switch 212. In some cases, system 200 further includes a fourth switch 213—denoted as CMx_AC—coupled to third switch 212 and first capacitor 214.

In operation, the first voltage is set to twice the target voltage (e.g., 5V, 10V, etc.). This means if the first voltage is VRECT, the target voltage would be VRECT/2. Upon initiation, first circuit 201 may send a first signal to first input 202 to activate the transition of first switch 204 to its ON state. At the same time, first circuit 201 may send a second signal to second input 203 to hold second switch 205 in its OFF state while the first switch is actively ON. In a closely coordinated sequence, third switch 212 may be turned on following the ON transition of first switch 204. For instance, first circuit 201 may send a third signal to turn on the third switch 212 in coordination with the ON transition of first switch 204. In some cases, a temporal delay may be imposed on the activation of third switch 212, ensuring it only switches to its ON state after first switch 204 has achieved full activation. It is to be appreciated that the states of first switch 204 and second switch 205, as controlled by first circuit 201, should remain opposite to each other during the operation to eliminate the risk of short circuit.

Due to the voltage-dividing action of first resistor 207 and second resistor 208, the second voltage at the first output could be a fraction of the first voltage at voltage generator 106. For instance, the second voltage ACx_BIAS may be less than or equal to half of the first voltage VRECT. In an example, ACx_BIAS is half of the VRECT value (e.g., VRECT/2). The first side of first capacitor 214 may be coupled to a pinout ACx.

During an operation cycle where first switch 204 and third switch 212 are on and second switch 205 is off, the first side of first capacitor 214 is charged to the value of VRECT. Simultaneously, the second side of first capacitor 214, being connected to the first output of buffer 211 through third switch 212, is charged to half of the VRECT value (e.g., VRECT/2). This systematic charge distribution ensures that the DC bias across first capacitor 214 remains at VRECT/2. The DC bias subtraction at first capacitor 214 is an important step in generating a bipolar signal. When first switch 204 and third switch 212 are turned off and second switch 205 is turned on, the first side of first capacitor 214 is discharged to ground. Since the second side of first capacitor 214 is VRECT/2 below the first side, this causes the second side of first capacitor 214 to drop to a voltage of −VRECT/2 with respect to ground. This process effectively removes the DC component from the input signal to generate the first output signal second output 215. By using first capacitor 214 to perform DC subtraction, DC leakage can be effectively minimized, producing a bipolar signal with reduced DC component. In real-world applications, VRECT may undergo occasional fluctuations, the operational frequency of the first capacitor 214 can thus be optimized to respond promptly. The timely subtraction of the DC bias allows system 200 consistently outputs the desired bipolar signal, even in the presence of voltage fluctuations.

In various implementations, while system 200 is idle (e.g., both first switch 204 and second switch 205 are off), the first output signal at second output 215 may be around ±VRECT/2. This is because first capacitor 214 is acting as a negative charge pump. When first switch 204 and third switch 212 are off, the first capacitor 214 can be charged to a voltage of VRECT/2. To normalize the first output signal to zero volts, fourth switch 213 may be activated to charge first capacitor 214 up to a voltage equivalent of VRECT/2, consequently stabilizing the first output signal at zero volts. It is to be appreciated that system 200 strategically generates bipolar output signals based on a unipolar based design by configuring first capacitor 214 to function as a negative charge pump. By leveraging this configuration, system 200 effectively subtracts the voltage, facilitating the conversion of a unipolar input into a bipolar signal. Such an approach not only maintains the signal's integrity but also substantially minimizes potential DC leakage, resulting in more efficient and reliable operations.

Figure 3:
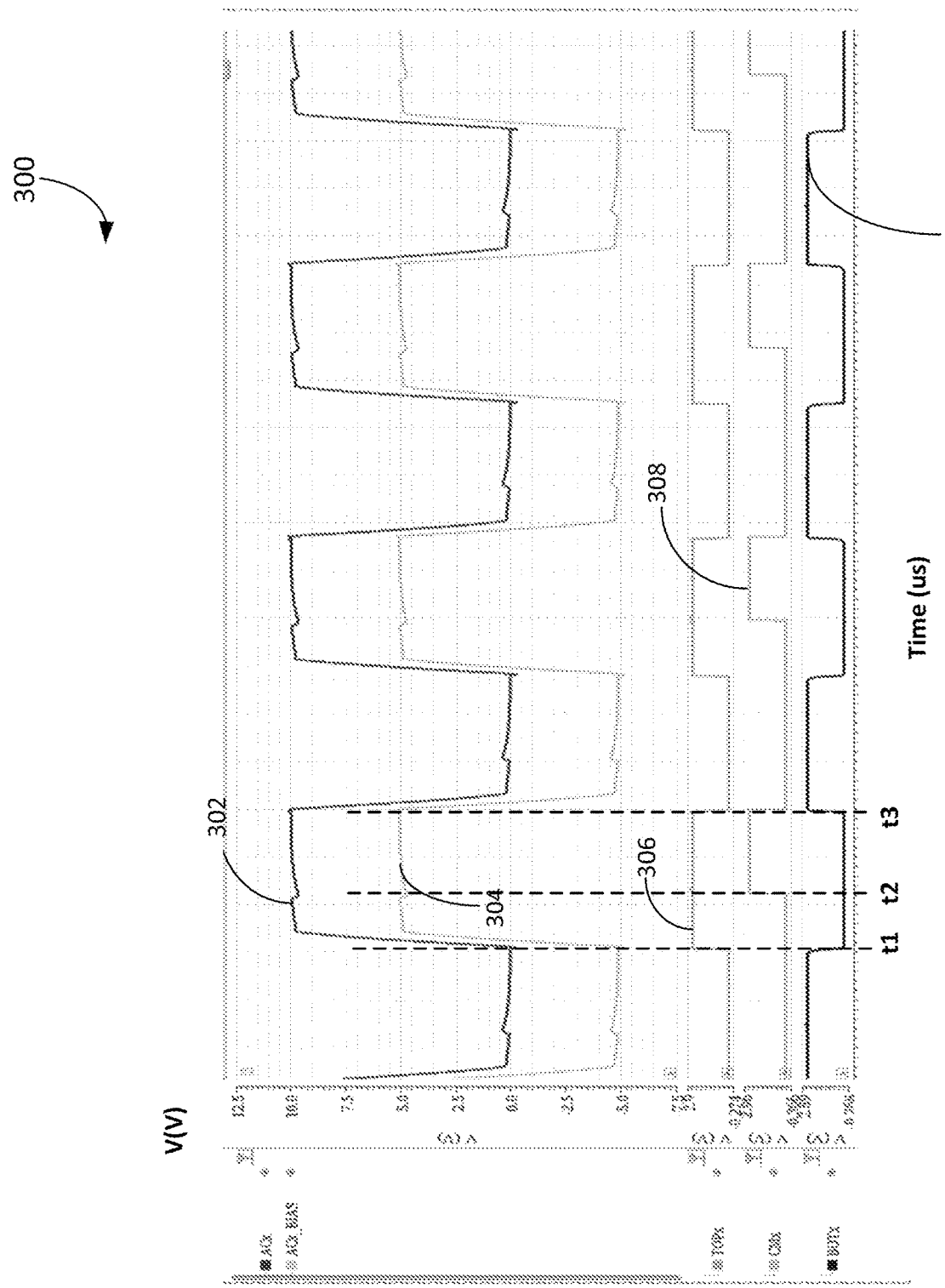
FIG. 3 is a graph illustrating a voltage/time plot for components within a power conversion system according to embodiments of the subject technology.

FIG. 3 is a graph illustrating a voltage/time plot 300 for components within a power conversion system (e.g., system 200 of FIG. 2) according to embodiments of the subject technology. This diagram merely provides an example, which should not unduly limit the scope of the claims. One of ordinary skill in the art would recognize many variations, alternatives, and modifications. In various implementations, waveform 302 represents a waveform of a first voltage as measured at pinout ACx. Waveform 304 represents a waveform of a second voltage as measured at pinout ACx_BIAS. Waveform 306 represents a waveform of a first signal as measured on first switch 204. Waveform 308 represents a waveform of a third signal as measured on third switch 212. Waveform 310 represents a waveform of a second signal as measure on second switch 205. The switching on of first switch 204, second switch 205, and third switch 212 is indicated by a rise in the measured voltage; the switching off of first switch 204, second switch 205, and third switch 212 is indicated by a corresponding voltage drop.

In some embodiments, the first voltage is set to twice the target voltage (e.g., 5V, 10V, etc.). As an example, if the target voltage (e.g., a desired output signal) is ±5V, the first voltage can be set to 10V. The operation of system 200 may be performed via one or more specific sequences. For instance, upon initiation, first switch 204 is turned on—as indicated by a voltage rise—at a first time t1. At the same time, second switch 205 is turned off—as indicated by a voltage drop—at first time t1. In a closely coordinated sequence, third switch 212 is turned on at a second time t2 following the switching on of first switch 204. The sequencing of switch activations and deactivations is an important aspect of the subject technology for achieving the desired bipolar signal while maintaining minimized DC leakage. The relationship between the duty cycles of the first, second, and third signals is important in coordinating the operations of the first switch 204, second switch 205, and third switch 212. In specific implementations, third switch 212 is activated post the full activation of the first switch 204. In other words, the third signal may be characterized by a duty cycle that lags behind the first signal's duty cycle by a fraction. This staggered operation ensures that each component is afforded adequate response time, facilitating a harmonized operation and mitigating the risk of signal interference or overlap. Furthermore, it is to be appreciated that the duty cycle of the first switch 204 may be consistently opposite to that of second switch 205, ensuring that their operational states remain inversely related, thereby preventing potential short circuits.

It is to be appreciated that the switching circuits (e.g., first switch 204, second switch 205, or third switch 212) may operate at a variable frequency depending on the application. By monitoring the characteristics of the input signal, the system dynamically modulates its switching patterns. For example, during the initiation of a signal burst, the system may actively switch for a few consecutive cycles to promptly establish the desired bipolar state. Once the state is stabilized, the system may optimize its operation by reducing the switching frequency, possibly engaging every 10th, 50th, or 100th cycle. This intermittent switching may be employed for maintenance or correctional purposes. In some cases, the system may determine the need for a bipolar adjustment cycle based on the voltage level measured at the CMx pin. By dynamically adjusting its operational frequency based on real-time feedback, the system not only conserves energy but also extends the durability of its components.

Due to the voltage-dividing action of first resistor 207 and second resistor 208, the second voltage at the first output could be a fraction of the first voltage at voltage generator 106. As an example, when first switch 204 and third switch 212 are on and second switch 205 is off (e.g., shortly after first time t1), the first voltage is around 10V and the second voltage is around 5V. When first switch 204 and third switch 212 are turned off and second switch 205 is turned on at a third time t3, first capacitor 214 (e.g., the second side of first capacitor 214) discharges to a negative voltage (e.g., −5V), which is then used to offset the positive voltage from the unipolar input signal. This process effectively removes the DC component from the input signal to generate the first output signal. The cycling of these switch operations, denoting activation and deactivation sequences, can be repeated multiple times, allowing for adaptability and responsiveness based on specific system demands or environmental conditions.

Figure 4:
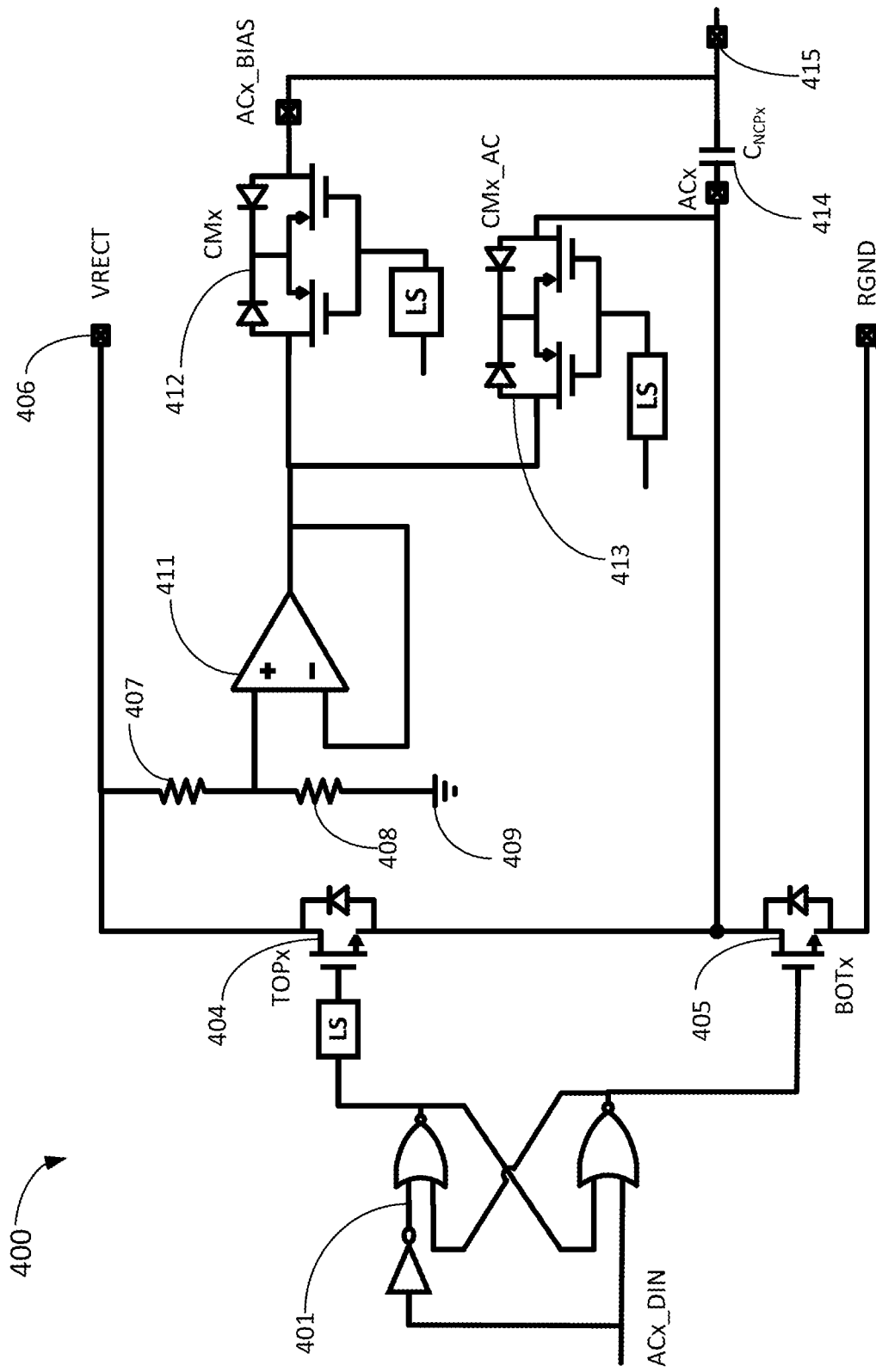
FIG. 4 is a circuit diagram illustrating a power conversion system according to embodiments of the subject technology.

FIG. 4 is a circuit diagram illustrating a power conversion system according to embodiments of the subject technology. This diagram merely provides an example, which should not unduly limit the scope of the claims. One of ordinary skill in the art would recognize many variations, alternatives, and modifications. As previously noted, system 400 may be implemented as any type of power conversion system, such as a rectifier, an inverter, or other bidirectional converter. As shown, system 400 may include at least one of a first circuit 401, a first switch 404, a second switch 405, a voltage generator 406, a first resistor 407, a second resistor 408, a first ground terminal 410, a second ground terminal 409, a buffer 411, a third switch 414, a first capacitor 414, a fourth switch 413, and a second output 415. For example, system 400 may be implemented as an inverter, which is configured to receive an input signal (e.g., a DC signal) and produce an output signal (e.g., an AC signal output). In other examples, system 400 may be implemented as a rectifier, which is configured to receive an input signal (e.g., an AC signal) and produce an output signal (e.g., a DC signal output).

In various implementations, voltage generator 406 may be characterized by a first voltage, denoted as VRECT. For instance, the first voltage is set to twice the target voltage (e.g., 5V, 10V, etc.). This means if the first voltage is VRECT, the target voltage would be VRECT/2. Second output 415 may be configured to output a first output signal, which may be characterized by a target voltage depending on the application. In various implementations, the first voltage of voltage generator 406 may be determined or adjusted based on the target voltage.

In some embodiments, the operation of system 400 relies on the systematic and coordinated switching of first switch 404 and second switch 405 according to specific conditions. For example, circuit 401 is configured to control the operation of first switch 404, second switch 405, and third switch 412. Circuit 410, denoted as ACx_DIN, may include circuitry and/or other components, such as programmable logic, microcontrollers, and/or software, and can send control signals to first switch 404 and second switch 405 to regulate their operation. In some cases, a level shifter circuit (e.g., denoted as LS in FIG. 4) may be coupled to first switch 404. The level shifter circuit is configured to translate the voltage levels, ensuring that first switch 404 is driven with an appropriate voltage level to optimize its operation. Upon initiation, first circuit 401 may send a first signal to first input 402 to activate the transition of first switch 404 to its ON state. At the same time, first circuit 401 may send a second signal to second input 403 to hold second switch 405 in its OFF state while the first switch is actively ON. In a closely coordinated sequence, third switch 412 may be turned on following the ON transition of first switch 404. For instance, first circuit 401 may send a third signal to turn on the third switch 412 in coordination with the ON transition of first switch 404. In some cases, a temporal delay may be imposed on the activation of third switch 412, ensuring it only switches to its ON state after first switch 404 has achieved full activation. In some embodiments, third switch 412 may include, but are not limited to, field effect transistors (FETs) such as Metal Oxide Semiconductor FETs (MOSFETs), a bipolar junction transistor (BJT), a thyristor, or other types of transistors or other types of switches. For example, third switch 412 may be implemented as a PMOS (e.g., a back-to-back PMOS), a LDPMOS, and/or the like. In some cases, a level shifter circuit may be coupled to third switch 412. The level shifter circuit is configured to translate the voltage levels, ensuring that third switch 412 is driven with an appropriate voltage level to optimize its operation.

Due to the voltage-dividing action of first resistor 407 and second resistor 408, the second voltage at the first output could be a fraction of the first voltage at voltage generator 106. For instance, the second voltage ACx_BIAS may be less than or equal to half of the first voltage VRECT. In an example, ACx_BIAS is half of the VRECT value (e.g., VRECT/2). The first side of first capacitor 414 may be coupled to a pinout ACx.

During an operation cycle where first switch 404 and third switch 412 are on and second switch 405 is off, the first side of first capacitor 414 is charged to the value of VRECT. Simultaneously, the second side of first capacitor 414, being connected to the first output of buffer 411 through third switch 412, is charged to half of the VRECT value (e.g., VRECT/2). This systematic charge distribution ensures that the DC bias across first capacitor 414 remains at VRECT/2. The DC bias subtraction at first capacitor 414 is an important step in generating a bipolar signal. When first switch 404 and third switch 412 are turned off and second switch 405 is turned on, first capacitor 414 (e.g., the second side of first capacitor 414) discharges to a negative voltage (e.g., −VRECT/2), which is then used to offset the positive voltage from the unipolar input signal. This process effectively removes the DC component from the input signal to generate the first output signal second output 415. By using first capacitor 414 to perform DC subtraction, DC leakage can be effectively minimized, producing a bipolar signal with reduced DC component.

In various implementations, while system 400 is idle (e.g., both first switch 404 and second switch 405 are off), a fourth switch 413 may be turned on to normalize the first output signal to zero volts. In some embodiments, fourth switch 413 may include, but is not limited to, field effect transistors (FETs) such as Metal Oxide Semiconductor FETs (MOSFETs), a bipolar junction transistor (BJT), a thyristor, or other types of transistors or other types of switches. For example, fourth switch 413 may be implemented as a PMOS (e.g., a back-to-back PMOS), a LDPMOS, and/or the like. In some cases, a level shifter circuit may be coupled to fourth switch 413. The level shifter circuit is configured to translate the voltage levels, ensuring that fourth switch 413 is driven with an appropriate voltage level to optimize its operation.

Figure 5:
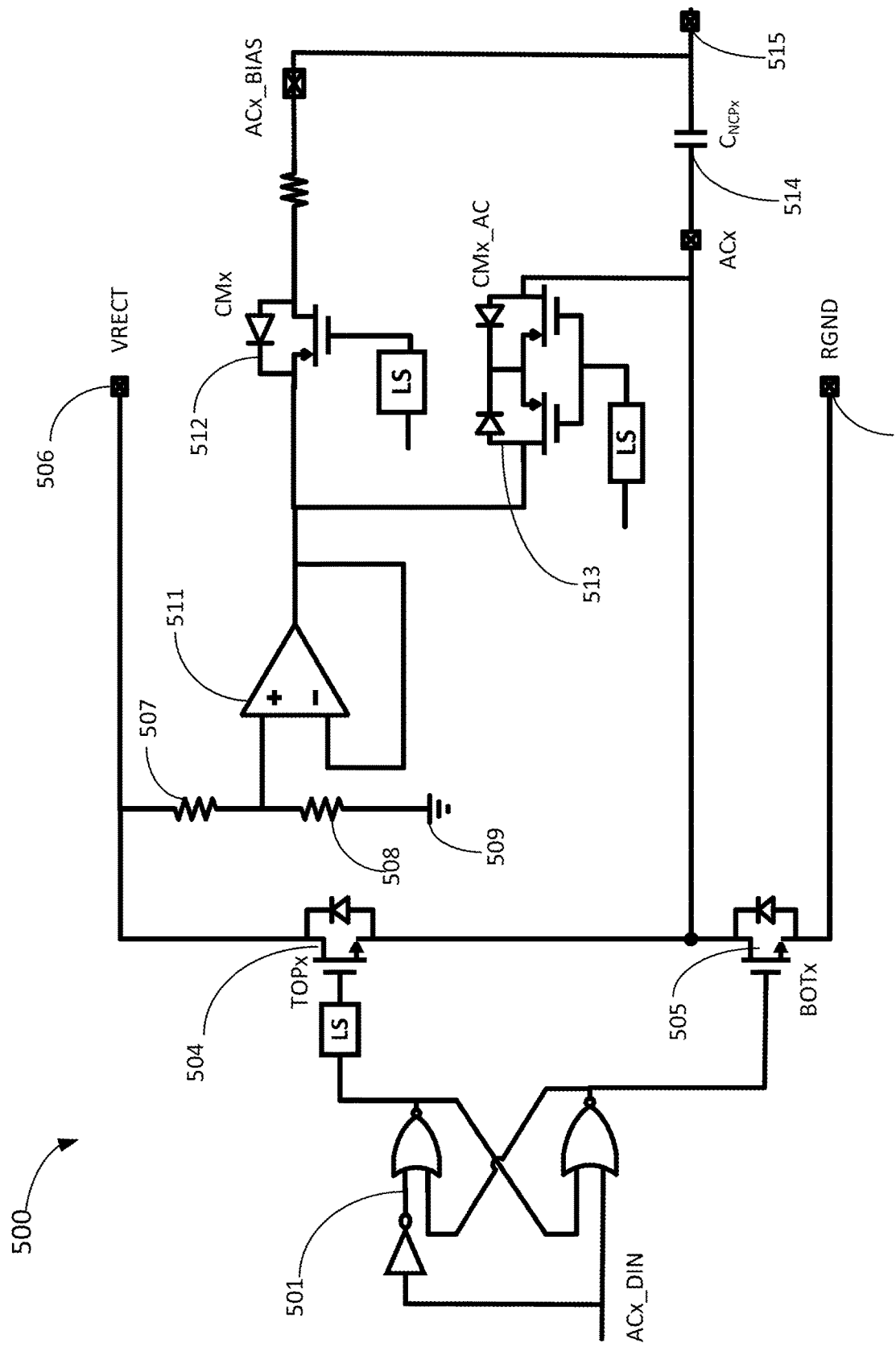
FIG. 5 is a circuit diagram illustrating a power conversion system according to embodiments of the subject technology.

FIG. 5 is a circuit diagram illustrating a power conversion system 500 according to not unduly limit the scope of the claims. One of ordinary skill in the art would recognize many variations, alternatives, and modifications. As previously noted, system 500 may be implemented as any type of power conversion system, such as a rectifier, an inverter, or other bidirectional converter. Like the system 500, system 500 may include at least one of a first circuit 501, a first switch 504, a second switch 505, a voltage generator 506, a first resistor 507, a second resistor 508, a first ground terminal 510, a second ground terminal 509, a buffer 511, a third switch 514, a first capacitor 514, a fourth switch 513, and a second output 515. For example, system 500 may be implemented as an inverter, which is configured to receive an input signal (e.g., a DC signal) and produce an output signal (e.g., an AC signal output). In other examples, system 500 may be implemented as a rectifier, which is configured to receive an input signal (e.g., an AC signal) and produce an output signal (e.g., a DC signal output).

In various implementations, voltage generator 506 may be characterized by a first voltage, denoted as VRECT. For instance, the first voltage is set to twice the target voltage (e.g., 5V, 10V, etc.). This means if the first voltage is VRECT, the target voltage would be VRECT/2. Second output 515 may be configured to output a first output signal, which may be characterized by a target voltage depending on the application. In various implementations, the first voltage of voltage generator 506 may be determined or adjusted based on the target voltage.

In some embodiments, the operation of system 500 relies on the systematic and coordinated switching of first switch 504 and second switch 505 according to specific conditions. For example, circuit 501 is configured to control the operation of first switch 504, second switch 505, and third switch 512. Circuit 510, denoted as ACx_DIN, may include circuitry and/or other components, such as programmable logic, microcontrollers, and/or software, and can send control signals to first switch 104 and second switch 105 to regulate their operation. Upon initiation, first circuit 501 may send a first signal to first input 502 to activate the transition of first switch 504 to its ON state. At the same time, first circuit 501 may send a second signal to second input 503 to hold second switch 505 in its OFF state while the first switch is actively ON. In a closely coordinated sequence, third switch 512 may be turned on following the ON transition of first switch 504. For instance, first circuit 501 may send a third signal to turn on the third switch 512 in coordination with the ON transition of first switch 504. In some cases, a temporal delay may be imposed on the activation of third switch 512, ensuring it only switches to its ON state after first switch 504 has achieved full activation. In some embodiments, third switch 512 may include, but is not limited to, field effect transistors (FETs) such as Metal Oxide Semiconductor FETs (MOSFETs), a bipolar junction transistor (BJT), a thyristor, or other types of transistors or other types of switches. For example, third switch 512 may be implemented as a PMOS (e.g., a back-to-back PMOS), an LDPMOS, and/or the like.

Due to the voltage-dividing action of first resistor 507 and second resistor 508, the second voltage at the first output could be a fraction of the first voltage at voltage generator 106. For instance, the second voltage ACx_BIAS may be less than or equal to half of the first voltage VRECT. In an example, ACx_BIAS is half of the VRECT value (e.g., VRECT/2). The first side of first capacitor 514 may be coupled to a pinout ACx.

During an operation cycle where first switch 504 and third switch 512 are on and second switch 505 is off, the first side of first capacitor 514 is charged to the value of VRECT. Simultaneously, the second side of first capacitor 514, being connected to the first output of buffer 511 through third switch 512, is charged to half of the VRECT value (e.g., VRECT/2). This systematic charge distribution ensures that the DC bias across first capacitor 514 remains at VRECT/2. The DC bias subtraction at first capacitor 514 is an important step in generating a bipolar signal. When first switch 504 and third switch 512 are turned off and second switch 505 is turned on, first capacitor 514 (e.g., the second side of first capacitor 514) discharges to a negative voltage (e.g., −VRECT/2), which is then used to offset the positive voltage from the unipolar input signal. This process effectively removes the DC component from the input signal to generate the first output signal second output 515. By using first capacitor 514 to perform DC subtraction, DC leakage can be effectively minimized, producing a bipolar signal with reduced DC component.

In various implementations, while system 500 is idle (e.g., both first switch 504 and second switch 505 are off), a fourth switch 513 may be turned on to normalize the first output signal to zero volts. In some embodiments, fourth switch 513 may include, but is not limited to, field effect transistors (FETs) such as Metal Oxide Semiconductor FETs (MOSFETs), a bipolar junction transistor (BJT), a thyristor, or other types of transistors or other types of switches. For example, fourth switch 513 may be implemented as a PMOS (e.g., a back-to-back PMOS), an LDPMOS, and/or the like.

While the above is a full description of the specific embodiments, various modifications, alternative constructions and equivalents may be used. Therefore, the above description and illustrations should not be taken as limiting the scope of the subject technology which is defined by the appended claims.

What is claimed is:

1. A device, comprising:
a first switch comprising a first input, the first input being configured to receive a first signal;
a voltage generator coupled to the first switch, the voltage generator being characterized by a first voltage;
a second switch coupled to the first switch, the second switch comprising a second input configured to receive a second signal;
a first ground terminal coupled to the second switch;
a first resistor coupled to the first switch and the voltage generator, the first resistor being characterized by a first resistance;
a second resistor coupled to the first resistor, the second resistor being characterized by a second resistance;
a buffer comprising a third input and a first output, the third input being coupled to the first resistor and the second resistor, the first output being characterized by a second voltage;
a third switch coupled to the first output;
a first capacitor coupled to the first switch and the third switch; and
a second output coupled to the third switch and the first capacitor.

2. The device of claim 1, further comprising a first circuit coupled to the first switch and the second switch, the first circuit being configured to send the first signal to the first input and send the second signal to the second input.

3. The device of claim 1, wherein:
the second output is configured to output a first output signal; and
the buffer further comprises a fourth input coupled to the first output.

4. The device of claim 3, wherein the first output signal comprises a positive signal and a negative signal.

5. The device of claim 1, further comprising a fourth switch coupled to the third switch and the first capacitor.

6. The device of claim 1, wherein the first switch comprises a complementary metal-oxide semiconductor (CMOS) or a bipolar junction transistor (BJT).

7. The device of claim 1, wherein the first switch comprises a gate coupled to the first input.

8. The device of claim 1, wherein a ratio of the first resistance to the second resistance is less than 1.1:1.

9. The device of claim 1, wherein the second voltage is less than or equal to half of the first voltage.

10. The device of claim 1, wherein the third switch comprises a p-channel metal-oxide semiconductor (PMOS) or a laterally-diffused metal-oxide semiconductor (LDMOS).

11. A device, comprising:
a first switch comprising a first input, the first input being configured to receive a first signal;
a voltage generator coupled to the first switch, the voltage generator being characterized by a first voltage;
a second switch coupled to the first switch, the second switch comprising a second input configured to receive a second signal;
a first ground terminal coupled to the second switch;
a first resistor coupled to the first switch and the voltage generator;
a second resistor coupled to the first resistor;
a buffer comprising a third input and a first output, the third input being coupled to the first resistor and the second resistor, the first output being characterized by a second voltage;
a third switch coupled to the first output;
a first capacitor coupled to the first switch and the third switch; and
a second output coupled to the third switch and the first capacitor.

12. The device of claim 11, further comprising a first circuit coupled to the first switch and the second switch, the first circuit being configured to send the first signal to the first input and send the second signal to the second input to control switching of the first switch and the second switch.

13. The semiconductor device of claim 11, wherein the second output is configured to output a first output signal.

14. The device of claim 11, further comprising a fourth switch coupled to the third switch and the first capacitor.

15. The device of claim 11, wherein the second voltage is less than or equal to half of the first voltage.

16. The device of claim 11, further comprising a second ground terminal coupled to the second resistor.

17. A device, comprising:
a first switch comprising a first input, the first input being configured to receive a first signal;

a voltage generator coupled to the first switch, the voltage generator being characterized by a first voltage;
a second switch coupled to the first switch, the second switch comprising a second input configured to receive a second signal;
a first ground terminal coupled to the second switch;
a first resistor coupled to the first switch and the voltage generator, the first resistor being characterized by a first resistance;
a second resistor coupled to the first resistor, the second resistor being characterized by a second resistance;
a second ground terminal coupled to the second resistor;
a buffer comprising a third input and a first output, the third input being coupled to the first resistor and the second resistor, the first output being characterized by a second voltage;
a third switch coupled to the first output;
a first capacitor coupled to the first switch and the third switch; and
a second output coupled to the third switch and the first capacitor.

18. The device of claim 17, further comprising a first circuit coupled to the first switch, the first circuit being configured to send the first signal to the first input.

19. The device of claim 17, wherein a ratio of the first resistance to the second resistance is less than 1.1:1.

20. The device of claim 17, further comprising a fourth switch coupled to the third switch and the first capacitor.

* * * * *